Aug. 2, 1966 D. E. STEVENS 3,264,381
METHOD OF MANUFACTURING LOW DENSITY PRODUCTS
OF MOLDED SYNTHETIC RESIN
Filed April 18, 1963

INVENTOR.
DONALD E. STEVENS
BY
Wheeler, Wheeler & Wheeler
ATTORNEYS

United States Patent Office 3,264,381
Patented August 2, 1966

3,264,381
METHOD OF MANUFACTURING LOW DENSITY PRODUCTS OF MOLDED SYNTHETIC RESIN
Donald E. Stevens, Sheboygan Falls, Wis., assignor to Kohler-Joa Corporation, Sheboygan Falls, Wis., a corporation of Wisconsin
Filed Apr. 18, 1963, Ser. No. 274,049
10 Claims. (Cl. 264—45)

This invention relates to a method of manufacturing low density products of molded synthetic resin.

It is well-known that polystyrene beads impregnated with a blowing agent can be expanded by exposure to steam to a degree which, within limits, will predetermine the density of the product molded therefrom. The blowing agents commonly used are pentane, hexane or heptane saturated hydrocarbons, used in either a branch or straight chain form, or combinations thereof. The partially expanded beads are placed in a preheated mold and further expanded by heat, as by injection of steam, to fill the mold and bond together the agglomerated beads. The mold is then cooled, usually by water, to stabilize the molded product.

Using this technique, a density 1.1 pounds per cubic foot is about the minimum obtainable, as further exposure to heat in the preliminary steaming process causes the beads to break down rather than continuing to expand.

The present invention is based upon the discovery that much lower densities can be achieved by conducting the initial expansion in the mold at a mold capacity less than the ultimate size of the desired object, followed by opening the mold to the desired size. Before the mold is enlarged, agglomeration and fusion will have occurred and the beads will thereby have become protected against disintegration. Expansion can then be continued to such an extent that the resulting product may have a density which is no more than half of that which has heretofore been regarded as the minimum obtainable.

A very important additional advantage of this process lies in the fact that the product cools itself while still within the mold. In the routine cycle heretofore followed, a minimum of approximately two minutes has been required for cooling a product of the type here under discussion. If the mold is enlarged before the beads are fully expanded to permit the continued expansion of the agglomerated mass as herein described, the excess heat of the product is absorbed chemically by an endothermic reaction so that the heat required for continued expansion is actually derived from the product itself, thus removing stored energy. In consequence, the material bcomes so cool that only a few seconds are required to stabilize the product prior to removal from the mold.

It will be understood that the actual apparatus used commercially will be much more complex than that illustrated, the drawings being merely diagrammatic.

Figure 1:
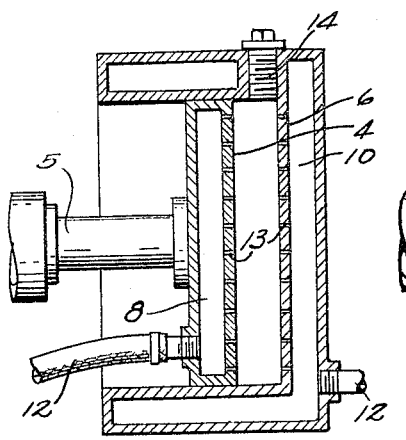
FIG. 1 is a diagrammatic view in cross section through a mold used in the practice of this invention, the parts of the mold being shown in the relative position in which they are found during the first part of the reaction.
Figure 2:
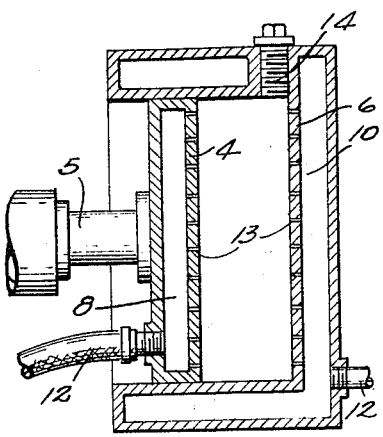
FIG. 2 is a view similar to FIG. 1 showing the parts in the relative positions which they occupy at the completion of the reaction.
Figure 3:
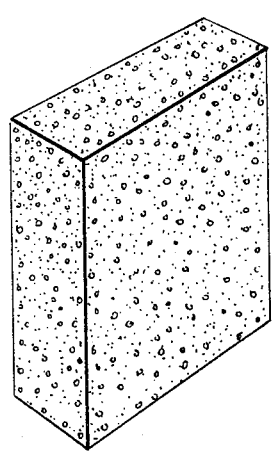
FIG. 3 is a view in perspective showing the completed product.

In FIGS. 1 and 2, a male mold part 4 and a female mold part 6 are relatively movable, having the relationship of a piston and cylinder, for purposes of illustration. A ram 5 advances and retracts mold part 4. The mold part 4 has a jacket space 8 and the mold part 6 has a jacket space at 10. In addition, each of the jackets 8 and 10 has an inlet connection such as steam pipe 12. Well distributed ducts 13 open from the jacket spaces into the mold to deliver steam into the beads. For certain purposes a known set of probes is used for this purpose instead of the ducts leading from the jacket. A plugged opening 14 serves both as a vent and an opening through which the pre-expanded beads may be introduced.

No illustration of the steam expander is included, this being conventional equipment. Neither is the spray cooling or stabilizing apparatus shown, this also being conventional.

Steam is permitted to flow through the mold until moisture is removed and the mold is raised to the desired temperature. The mold is then filled with the pre-expanded beads of synthetic resin. The opening 14 is plugged and steam is blown into the beads to activate the foaming agent and cause the beads to fill the mold and bond themselves together. When this result is accomplished, there is still a very substantial amount of residual heat stored in the beads and the mold and the pressure is about 50 pounds per square inch.

Assume that the product which is to be made is a package part about 4 inches by 5 inches by 2 inches and it is desired that this have only one-half pound density when complete. The initial treatment in the expander would be of a nature which would normally be used to produce a density of about one pound per cubic foot or 1.1 pounds per cubic foot, this being about the minimum which can be achieved commercially. The first step of my improved process is essentially according to the prior art except that it results in a product only half as thick as is ultimately desired. When this first step has been completed, the product will be one inch thick and have a density of about 1.1 pounds per cubic foot.

As a second step, the mold will then be expanded, as by withdrawing the piston-like male element 4, or allowing it to yield under pressure of the expanding beads. The positive retraction is preferred, and is normally continued until available space within the mold is two inches thick instead of one inch thick. This doubles the volume. The heat remaining in the molded product will be used to effect further expansion of the fused agglomerated beads. As a result, the product has a density of only one-half pound per cubic foot and at the same time becomes so cool that it is virtually stabilized and at most requires a few seconds of spray to complete the stabilization before the mold is opened. The time of the cycle is greatly reduced as compared with standard practice and the product has the desired low density.

There may also be a further expansion cycle with or without additional introduction of steam. If there are to be three or more steps of expansion, I may, during the second step above described, continue to inject steam. After the product has reached the full capacity of the once-expanded mold, the introduction of steam, if any, may then be discontinued and the piston-like side of the mold again withdrawn to effect additional increase in capacity. The product will thereupon resume its expansion, consuming the heat residual in the material and reaching substantial stability before the mold is opened.

Figure 4:
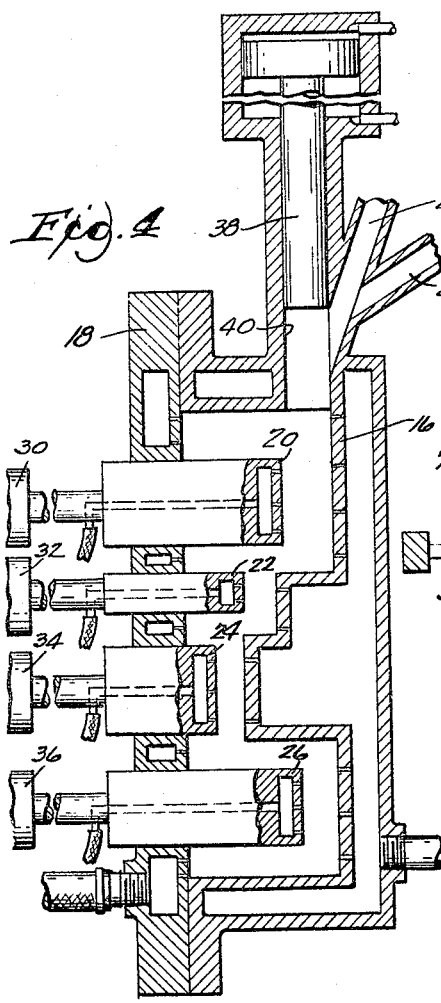
FIG. 4 is a view in transverse section showing a modified mold arrangement.

In FIG. 4, I have shown an arrangement in which the mold is designed to produce an article of irregular form, such as is very commonly used in packaging delicate goods for shipment. The female mold part 16 has a closure plate 18 through which a number of male mold parts 20, 22, 24 and 26 are individually movable by their respective rams 30, 32, 34 and 36. The drawing shows the rams in their advanced positions. They may be retracted to any distance required by the work as, for example, to positions in which they are flush with the cover plate 18. The total volumatic capacity increase resulting from the retraction of the several male elements 20, 22, 24 and 26 will desirably total an amount approximately equal to the capacity of the mold as it existed when the male elements were in the positions illustrated. In this organization the preexpanded beads will have been introduced around the advanced elements 20, 22, 24 and 26 to fill the mold. When these elements are withdrawn the beads will expand to fill the increased capacity of the mold.

As a means of introducing the beads I have shown an injecting nozzle which forms no part of the present invention and is to be included in a sepaarte application. There is a ram-retractable plug 38 operating in a bore 40 which leads into the mold. Communicating with bore 40 when the plug is retracted is a pipe 42 for the beads and an aspirating pipe 44 for the injecting fluid.

Figure 5:
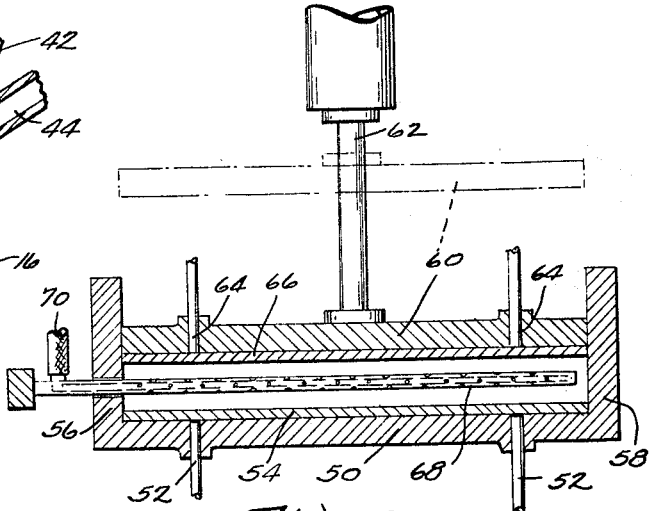
FIG. 5 is a view in transverse section showing a further modified mold arrangement for limiting the expanded material between facing plies.

My invention can be used to introduce expanded bead cores between facing plies of plywood or metal or any other appropriate material. FIG. 5 diagrammatically shows an arrangement for this purpose. The mold comprises a wall 50 having any appropriate means, such as vacuum ducts 52, for holding the desired facing ply 54 against the interior surface of the wall. Wall 50 comprises a part of a female mold which has side walls 56 and 58. Reciprocable between the side walls is the piston-like male element 60 of the mold, actuated by a ram 62. It likewise has vacuum ducts at 64 which serve to hold to the wall 60 the finish ply 66.

When the pre-expanded beads are introduced into the mold, either by the means of FIG. 1 or the means of FIG. 4, steam is injected into the beads. In this instance the injection can be accomplished, without the use of jackets, by using a battery of probes 68 which have ducts opening into the interior of the mold and through which steam may be injected as indicated by arrow 70. After initial expansion has taken place, as in FIG. 1, the piston 60 and the finish ply temporarily attached thereto are withdrawn for the purpose of doubling, more or less, the available capacity of the mold. The probes can be retracted bodily when no longer needed and the piston 60 withdrawn to permit the finished article to be removed.

The metal or plywood or other facing plies will usually have been coated with a reactive adhesive such as Minnesota Mining & Mfg. Co. #EC-1828, nitrile rubber base heat-reactivated contact cement so that, in the finished multiple-expanded product, the facing plies will be securely bonded to the expanded core.

While reference has been made herein to the production of a low density product, it is desired to note the fact that the invention is not limited to low density products. Such products have been referred to because they present the most difficult or extreme situation. However, as will be apparent to one skilled in the art, I may use 4 pound density material expanded in the mold to produce a product of 3 pound density, the object in this instance being to effect more rapid cooling, thus reducing the time cycle. The 3 pound density product could presumably be made by conventional procedures. Therefore, in this example, I would not be using the technique to produce something that could not otherwise be made. I would merely be saving production time.

I claim:

1. A method of manufacturing a molded product from beads of synthetic resin impregnated with a blowing agent, which method comprises the steps of: confining the beads in a space of limited volumetric capacity; heating the beads to effect expansion thereof to fill such space under pressure and to agglomerate and fuse the beads together; thereafter increasing the capacity of such space in an amount less than the residual capacity of the beads to expand, and maintaining the beads confined while using latent heat retained in the beads for effecting continued expansion while the beads retain sufficient heat to bring about additional expansion thereof to fill the increased space, such continued expansion of the beads and use of latent heat retained therein further serving inherently to reduce the heat of the fused beads, and removing the molded product from the mold only after the temperature thereof has been reduced and the capacity for expansion has been terminated and the form of the product has been determined.

2. A method according to claim 1 in which the increase in capacity of such space is effected in a single step.

3. A method according to claim 1 in which the increase in capacity of such space is effected progressively in a plurality of mold expansion steps with intervening dwell.

4. A method according to claim 1 in which the beads are confined between facing plies which delimit said space and the increase in capacity of such space entails a separation of such plies, each of the plies having an adhesive face to which the beads adhere during the heating step whereby the plies are joined by a low density core made up of the agglomerated beads.

5. A method according to claim 1 in which the space in which the beads are confined is irregular and has retractable mold elements projecting into the space to differing extents, said space being increased in capacity by retracting a plurality of such elements.

6. A method according to claim 1 in which the space in which the beads are confined is irregular and comprises at one side of such space relatively fixed and movable mold surfaces, the step of increasing the capacity of such space being accomplished by withdrawing one of said mold surfaces with respect to another thereof at the same side of the space.

7. A method according to claim 1 in which the space in which the beads are confined in part by generally parallel facing plies having a relatively shallow space between them, the step of heating the beads within such space including the injection of a heating fluid between said plies at various points within said space, and the step of increasing the capacity of the space including the bodily withdrawal of one of said plies with respect to the other.

8. A method according to claim 1 in which the expansion of the beads prior to increasing the capacity of such space is to the approximate limit to which the beads can be caused to fuse to form a coherent product, and the molded product resulting from said additional expansion is a coherent product of lower density than could be achieved with the beads employed, in the absence of such increase in capacity after initial bead expansion.

9. A method according to claim 1 in which the beads comprise polystyrene and the blowing agent is selected from a group consisting of the branched and straight chain forms of the pentane, hexane and heptane series of saturated hydrocarbons, and any mixture thereof.

10. A method of manufacturing a low density molded product from beads of synthetic resin impregnated with a blowing agent, which method comprises the steps of: pre-heating beads to effect initial expansion thereof; confining the beads in a space of limited volumetric capacity; heating the beads in such space to effect expansion thereof sufficient to fill such space under pressure and in the presence of continued application of heat to agglomerate and fuse the beads together; and thereafter expanding the space while continuing to confine the beads and continuing the expansion of the agglomerated and fused beads in the expanded space of larger capacity using the heat contained in the beads and the mold to continue to activate the blowing agent until the beads fill such space of larger capacity, the continued expansion of the beads without substantial addition of heat effecting rapid cooling thereof while the beads are still confined.

(References on following page)

References Cited by the Examiner

UNITED STATES PATENTS

| | | | |
|---|---|---|---|
| 2,276,143 | 3/1942 | Bell | 264—319 XR |
| 2,764,516 | 9/1956 | Pace | 264—45 |
| 2,768,407 | 10/1956 | Lindemann | 264—45 XR |
| 2,769,205 | 11/1956 | Pfleumer | 264—55 |
| 2,948,926 | 8/1960 | Kuhn | 264—51 |
| 2,977,639 | 4/1961 | Barkhuff et al. | 264—45 |
| 2,983,963 | 5/1961 | Jodell et al. | 264—46 |
| 3,007,209 | 11/1961 | Roberts | 264—55 XR |
| 3,029,472 | 4/1962 | Fischer | 264—52 XR |
| 3,042,967 | 7/1962 | Edberg | 262—53 |
| 3,057,007 | 10/1962 | Vanden Berg | 264—45 XR |
| 3,058,161 | 10/1962 | Beyer et al. | 264—47 |
| 3,058,162 | 10/1962 | Grabowski | 264—53 |
| 3,069,725 | 12/1962 | Root | 264—51 |
| 3,075,240 | 1/1963 | Casavina et al. | 264—45 XR |
| 3,081,488 | 3/1963 | Casavina et al. | 264—50 XR |
| 3,114,936 | 12/1963 | Willson | 264—86 |
| 3,159,693 | 12/1964 | Plymale | 264—53 |
| 3,166,617 | 1/1965 | Munk | 264—109 |

FOREIGN PATENTS

| | | |
|---|---|---|
| 596,847 | 8/1959 | Italy. |

ALEXANDER H. BRODMERKEL, *Primary Examiner.*

P. E. ANDERSON, *Assistant Examiner.*